US009437134B2

(12) United States Patent
Choi et al.

(10) Patent No.: US 9,437,134 B2
(45) Date of Patent: Sep. 6, 2016

(54) ORGANIC LIGHT EMITTING DISPLAY AND METHOD OF DRIVING THE SAME

(75) Inventors: Sang-Moo Choi, Yongin (KR); Do-Youb Kim, Yongin (KR); Soon-Sung Ahn, Yongin (KR); Brent Jang, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 591 days.

(21) Appl. No.: 12/773,658

(22) Filed: May 4, 2010

(65) Prior Publication Data

US 2011/0084958 A1 Apr. 14, 2011

(30) Foreign Application Priority Data

Oct. 9, 2009 (KR) ........................ 10-2009-0096108

(51) Int. Cl.
*G06F 3/038* (2013.01)
*G09G 3/32* (2016.01)

(52) U.S. Cl.
CPC .... *G09G 3/3233* (2013.01); *G09G 2320/0626* (2013.01); *G09G 2330/022* (2013.01)

(58) Field of Classification Search
CPC ............... G09G 2320/0626; G09G 2330/022; G09G 3/3233
USPC ................ 345/82, 98, 211–214, 691, 76–77, 345/204–205
See application file for complete search history.

(56) References Cited

U.S. PATENT DOCUMENTS

2003/0098828 A1 5/2003 Hunter et al.
2003/0146888 A1* 8/2003 Yamazaki et al. .............. 345/82
2003/0214825 A1 11/2003 Lee
2005/0012734 A1 1/2005 Johnson et al.
2005/0093958 A1* 5/2005 Mori et al. .................... 347/207

(Continued)

FOREIGN PATENT DOCUMENTS

CN 1459917 A 12/2003
CN 1596429 A 3/2005

(Continued)

OTHER PUBLICATIONS

Japanese Office action dated Mar. 21, 2012 for corresponding Japanese Patent Application No. 10-2009-007343, 3pp.

(Continued)

*Primary Examiner* — Quan-Zhen Wang
*Assistant Examiner* — Tony Davis
(74) *Attorney, Agent, or Firm* — Lewis Roca Rothgerber Christie LLP

(57) ABSTRACT

An organic light emitting display is capable of reducing power consumption. The organic light emitting display includes a scan driver for sequentially supplying scan signals to scan lines, a data driver for supplying data signals to data lines in synchronization with the scan signals, pixels located at crossing regions of the scan lines and the data lines, a timing controller for determining a normal driving mode for displaying a normal image and a standby driving mode displaying less information than the normal image, and a power source for supplying a first power and a second power to the pixels, wherein a voltage difference between the first power and the second power in the normal driving mode is a first voltage, and a voltage difference between the first power and the second power is a second voltage different from the first voltage.

17 Claims, 9 Drawing Sheets

(56) References Cited

U.S. PATENT DOCUMENTS

| | | | | |
|---|---|---|---|---|
| 2005/0140666 | A1 | 6/2005 | Shin | |
| 2008/0036704 | A1 | 2/2008 | Kim et al. | |
| 2008/0225062 | A1* | 9/2008 | Chang et al. | 345/691 |
| 2009/0027311 | A1 | 1/2009 | Lee et al. | |
| 2009/0109147 | A1* | 4/2009 | Park et al. | 345/76 |
| 2009/0195530 | A1 | 8/2009 | Ozaki | |
| 2009/0219265 | A1* | 9/2009 | Lee et al. | 345/205 |
| 2009/0244110 | A1 | 10/2009 | Ogura | |
| 2009/0244387 | A1* | 10/2009 | Lee et al. | 348/674 |
| 2009/0309818 | A1* | 12/2009 | Kim | 345/77 |
| 2010/0103160 | A1* | 4/2010 | Jeon et al. | 345/213 |

FOREIGN PATENT DOCUMENTS

| | | | |
|---|---|---|---|
| CN | 1599924 | A | 3/2005 |
| CN | 101354866 | A | 1/2009 |
| EP | 1 598 804 | A2 | 11/2005 |
| EP | 1 758 357 | A2 | 2/2007 |
| EP | 1 804 229 | A1 | 7/2007 |
| EP | 2 056 282 | A2 | 5/2009 |
| EP | 2 079 072 | A2 | 7/2009 |
| JP | 2003-177718 | | 6/2003 |
| JP | 2003-280587 | A | 10/2003 |
| JP | 2006-146167 | | 6/2006 |
| JP | 2006-337991 | | 12/2006 |
| JP | 2008-040451 | | 2/2008 |
| JP | 2009-109984 | | 5/2009 |
| KR | 1020060044354 | | 5/2006 |
| KR | 10-2006-0114476 | | 11/2006 |
| KR | 10-0805547 | B1 | 2/2008 |
| KR | 10-2008-0093750 | | 10/2008 |
| KR | 10-0894606 | B1 | 4/2009 |

OTHER PUBLICATIONS

KIPO Office action dated Apr. 26, 2011, for Korean priority Patent application 10-2009-0096108, 5 pages.

KIPO Office action dated Dec. 13, 2011, for Korean priority Patent application 10-2009-0096108, noting listed referenes in this IDS, as well as references previously submitted in an IDS, 1 page.

European Search Report dated Jun. 8, 2011, corresponding to European Patent Application No. 10251289.4; 16 pages.

SIPO Office action dated Oct. 29, 2012, for corresponding Chinese Patent application 201010212276.8, (8 pages).

SIPO Office Action dated May 15, 2013, issued in corresponding CN Application No. 201010212276.8 (6 pages).

JPO Office action dated Jun. 11, 2013, for corresponding Japanese Patent application 2010-007343, (2 pages).

SIPO Office action dated Aug. 12, 2013, for corresponding Chinese Patent application 201010212276.8, (6 pages).

EPO Office action dated Mar. 14, 2013, for corresponding European Patent application 10251289.4, (6 pages).

SIPO Patent Gazette dated Jun. 14, 2014, with English translation of cover page only, for corresponding Chinese Patent application 201010212276.8, (3 pages).

Notice of Allowance for JP Application No. 2010-007343, corresponding to KR Application No. 10-2009-0096108, dated Oct. 28, 2014 (3 pages).

* cited by examiner

ORGANIC LIGHT EMITTING DISPLAY AND METHOD OF DRIVING THE SAME

CROSS-REFERENCE TO RELATED APPLICATION

This application claims priority to and the benefit of Korean Patent Application No. 10-2009-0096108, filed on Oct. 9, 2009, in the Korean Intellectual Property Office, the entire content of which is incorporated herein by reference.

BACKGROUND

1. Field

An embodiment of the present invention relates to an organic light emitting display and a method of driving the same.

2. Description of Related Art

Recently, various flat panel displays (FPDs) capable of reducing weight and volume that are disadvantages of cathode ray tubes (CRTs) have been developed. The FPDs include liquid crystal displays (LCDs), field emission displays (FEDs), plasma display panels (PDPs), and organic light emitting displays.

Among the FPDs, the organic light emitting displays display images using organic light emitting diodes (OLEDs) that generate light by the re-combination of electrons and holes. The organic light emitting display has a high response speed and provides high display quality.

Currently, organic light emitting displays are mainly used for small portable devices (or small apparatus) such as mobile telephones. Because the small portable devices are carried and used by a user, the portable devices are generally driven by relatively small batteries or other limited portable power sources. Therefore, research on reducing the power consumption of the organic light emitting display used for a small portable device is ongoing.

SUMMARY

Accordingly, an aspect of the present invention provides an organic light emitting display capable of reducing power consumption without affecting picture quality and a method of driving the same.

In order to achieve the foregoing and/or other aspects of the present invention, according to one embodiment of the present invention, there is provided an organic light emitting display, including a scan driver for sequentially supplying scan signals to scan lines, a data driver for supplying data signals to data lines in synchronization with the scan signals, pixels located at crossing regions of the scan lines and the data lines, a timing controller for determining a normal driving mode for displaying a normal image or a standby driving mode for displaying less information than the normal image, and a power source for supplying a first power and a second power to the pixels, wherein a voltage difference between the first power and the second power in the normal driving mode is a first voltage, and a voltage difference between the first power and the second power in the standby driving mode is a second voltage different from the first voltage.

The first voltage may be larger than the second voltage. The data driver may be configured to supply the data signals corresponding to various gray levels in the normal driving mode and supply data signals determining emission or non-emission of the pixels in the standby driving mode.

Another embodiment of the present invention provides a method of driving an organic light emitting display including pixels including driving transistors for controlling the amount of current flowing from a first power source to a second power source via an organic light emitting diode (OLED). The method includes determining a normal driving mode for displaying a normal image or a standby driving mode for displaying less information than the normal image, in the normal driving mode, setting the voltages of the first power source and the second power source to drive the driving transistors in a saturation region, and in the standby driving mode, setting the voltages of the first power source and the second power source to drive the driving transistors in a linear region.

The method may further include supplying data signals to display an image with various gray levels by the pixels in the normal driving mode. The method may include driving the driving transistors as switches for the data signals to control the pixels to emit light or not to emit light in the standby driving mode.

In the organic light emitting display according to embodiments of the present invention and methods of driving the same, a voltage difference between the first power and the second power is reduced in the standby driving mode period so that power consumption can be reduced. In addition, because the driving transistors included in the pixels are driven as switches in the standby driving mode period, although leakage current is generated, the emission or non-emission state may be maintained. Therefore, the organic light emitting display may be driven with the driving frequency reduced.

BRIEF DESCRIPTION OF THE DRAWINGS

The accompanying drawings, together with the specification, illustrate exemplary embodiments of the present invention, and, together with the description, serve to explain the principles of embodiments of the present invention.

DETAILED DESCRIPTION

Figure 1:
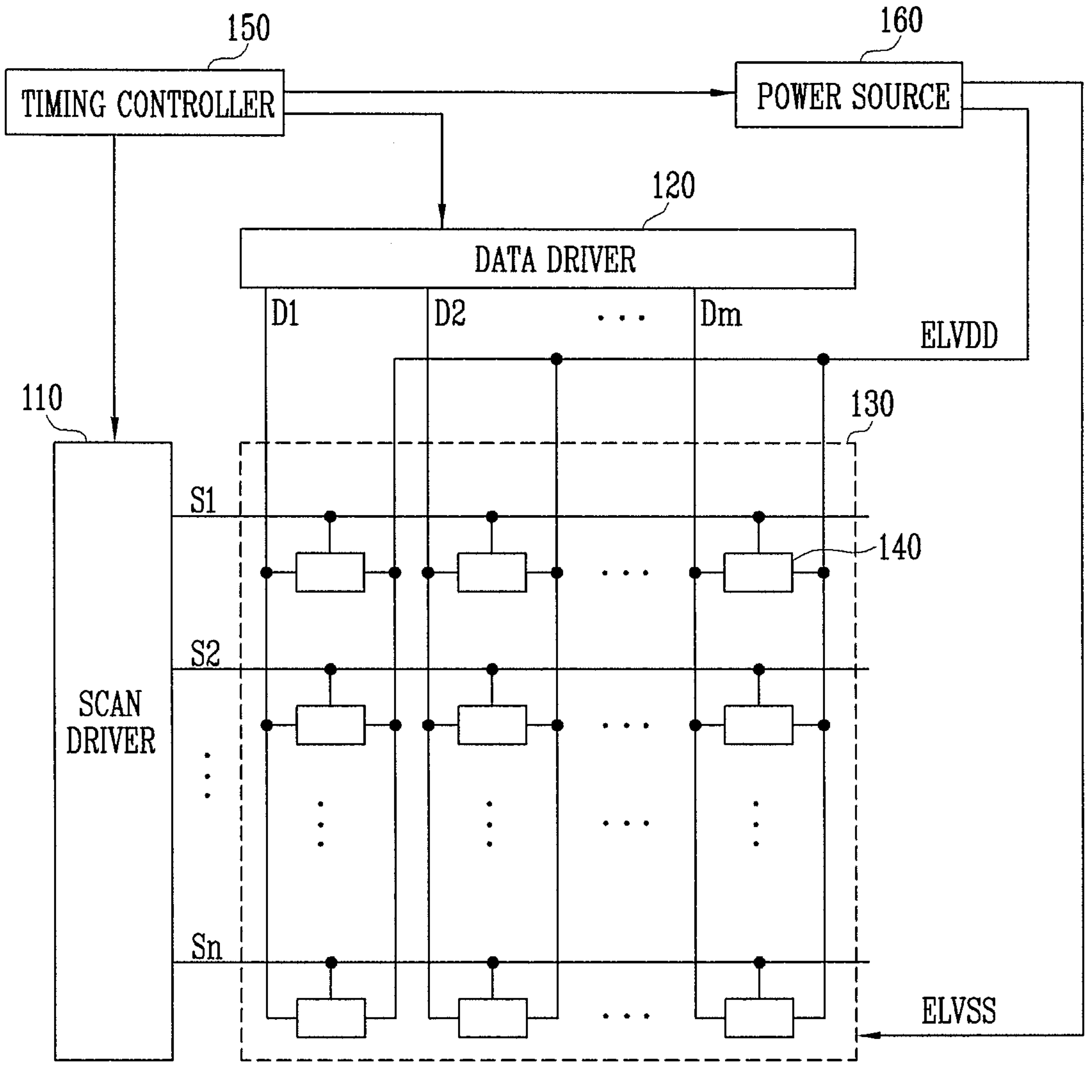
FIG. 1 is a view illustrating an organic light emitting display according to an embodiment of the present invention.

Hereinafter, certain exemplary embodiments according to the present invention will be described with reference to the accompanying drawings. Here, when a first element is described as being coupled to a second element, the first element may be directly coupled to the second element or may be indirectly coupled to the second element via a third element. Further, some of the elements that are not essential to a complete understanding of the invention are omitted for clarity. Also, like reference numerals refer to like elements throughout.

Hereinafter, exemplary embodiments of the present invention are described in detail with reference to FIGS. 1 to 9B.

FIG. 1 is a view illustrating an organic light emitting display according to one embodiment of the present invention.

Referring to FIG. 1, the organic light emitting display according to one embodiment of the present invention includes a display unit 130 including pixels 140 located at crossings of scan lines S1 to Sn and data lines D1 to Dm, a scan driver 110 for driving the scan lines S1 to Sn, a data driver 120 for driving the data lines D1 to Dm, a power source 160 for supplying a first power ELVDD and a second power ELVSS (e.g., the first power ELVDD may be referred to as a first power source generated by the power source 160 and the second power ELVSS may also be referred to as a second power source generated by the power source 160), and a timing controller 150 for controlling the scan driver 110, the data driver 120, and the power source 160.

The scan driver 110 generates scan signals by the control of the timing controller 150 and sequentially supplies the generated scan signals to the scan lines S1 to Sn. The scan signals have a voltage (for example, an active-low signal) at which the transistors included in the pixels 140 may be turned on. When the scan signals are sequentially supplied from the scan driver 110, the pixels 140 are selected in units of horizontal lines (e.g., the pixels 140 on the same horizontal line or coupled to the same scan line are concurrently turned on).

The data driver 120 generates data signals by the control of the timing controller 150 and supplies the generated data signals to the data lines D1 to Dm in synchronization with the scan signals. That is, the data signals are supplied to the pixels 140 selected by the scan signals. In addition, the data driver 120 controls the data signals output to the data lines D1 to Dm according to the mode control signal supplied from the timing controller 150.

For example, the data driver 120 supplies the data signals corresponding to the image to be displayed (e.g., gray levels corresponding to the image to be displayed) to the data lines D1 to Dm when the first mode control signal corresponding to a normal driving mode is input from the timing controller 150. The data driver 120 supplies the data signals corresponding to emission (or white) or non-emission (or black) to the data lines D1 to Dm when the second mode control signal corresponding to a standby driving mode is input from the timing controller 150. In the standby driving mode, the display unit 130 may display a black and white image including only reduced (or minimum) information (for example, a clock and the remaining amount of charge in a battery).

The power source 160 controls the voltage of the first power ELVDD and/or the second power ELVSS according to the mode control signal supplied from the timing controller 150. For example, when the first mode control signal is input from the timing controller 150, the power source 160 controls the voltages of the first power ELVDD and the second power ELVSS according to the normal driving mode. In the normal driving mode, the display unit 130 normally displays an image. The voltage values of the first power ELVDD and the second power ELVSS are set so that the driving transistors included in the pixels 140 may be driven in a saturation region. That is, a voltage difference between the first power ELVDD and the second power ELVSS is set at a first voltage. For example, in one embodiment, in the normal driving mode, the first power ELVDD is set at 5V and the second power ELVSS is set at −4V. Therefore, the first voltage may be set at 9V.

The power source 160 controls the voltages of the first power ELVDD and the second power ELVSS according to the standby driving mode when the second mode control signal is input from the timing controller 150. In the standby driving mode, the display unit 130 displays reduced (or minimum) information (or less information than a normal image displayed in the normal driving mode). The voltage values of the first power ELVDD and the second power ELVSS are set so that the driving transistors included in the pixels 140 may be driven in a linear region. In this case, the voltage difference between the first power ELVDD and the second power ELVSS is set at a second voltage that is lower than the first voltage. For example, in one embodiment, in the standby driving mode, the first power ELVDD is set at 3V and the second power ELVSS is set at 0V. Therefore, the second voltage may be set at 3V.

The timing controller 150 controls the scan driver 110 so that the scan signals may be generated and controls the data driver 120 so that the data signals may be generated. In addition, the timing controller 150 determines the driving mode of the organic light emitting display and supplies the mode control signal to the data driver 120 and the power source 160 according to the determined mode. Currently, various well-known methods may be used by the timing controller 150 to determine a mode.

In general, a mobile apparatus such as a mobile telephone is determined to be in the normal driving mode when input signals are continuously input from the point in time where a user starts an operation and is detertmined to be in the standby driving mode when input signals are not generated for a period of time (e.g., a predetermined period of time). The mode determining method is commonly used by a small portable device (such as a mobile telephone). As such, the mode determining methods are well known to those skilled in the art and will not be discussed further herein.

The display unit 130 receives the first power ELVDD and the second power ELVSS from the power source 160 to supply the first power ELVDD and the second power ELVSS to the pixels 140. When the first power ELVDD and the second power ELVSS corresponding to the normal driving mode are input, the driving transistors included in the pixels 140 are driven as constant current sources to supply the currents corresponding to the data signals to organic light emitting diodes (OLED). When the first power ELVDD and the second power ELVSS corresponding to the standby driving mode are input, the driving transistors included in the pixels 140 are driven as switches to control the emission or non-emission of the OLEDs.

In the embodiment shown in FIG. 1, for the sake of convenience, each of the pixels 140 is illustrated to be coupled to one scan line S and one data line D. However, the present invention is not limited to the above. For example, each of the pixels 140 may be additionally coupled to an emission control line (not shown) in addition to the scan line S. The pixels 140 according to embodiments of the present invention may have any of the various currently well-known structures.

Figure 2:
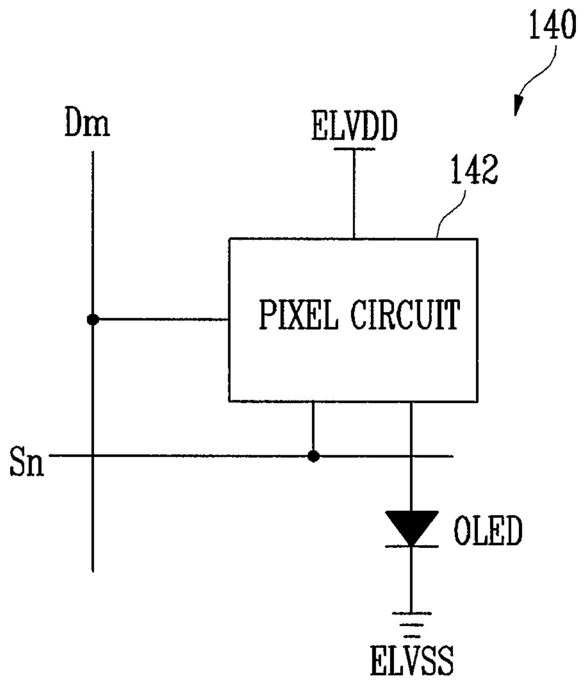
FIG. 2 is a view illustrating an embodiment of the pixel of FIG. 1.

FIG. 2 is a view illustrating a pixel 140 according to one embodiment of the present invention. In FIG. 2, for the sake of convenience, only the pixel coupled to the mth data line Dm and the nth scan line Sn is illustrated.

Referring to FIG. 2, the pixel 140 according to one embodiment of the present invention includes an OLED and a pixel circuit 142 for supplying current to the OLED.

The anode electrode of the OLED is coupled to the pixel circuit 142 and the cathode electrode of the OLED is coupled to the second power ELVSS. The OLED generates light with a brightness (e.g., a predetermined brightness) corresponding to the current supplied from the pixel circuit 142.

The pixel circuit 142 receives the data signal from the data line Dm when the scan signal is supplied to the scan line Sn. The pixel circuit 142 that has received the data signal supplies a current corresponding to the data signal to the OLED. The pixel circuit 142 may be any of various currently well-known circuits.

Figure 3:
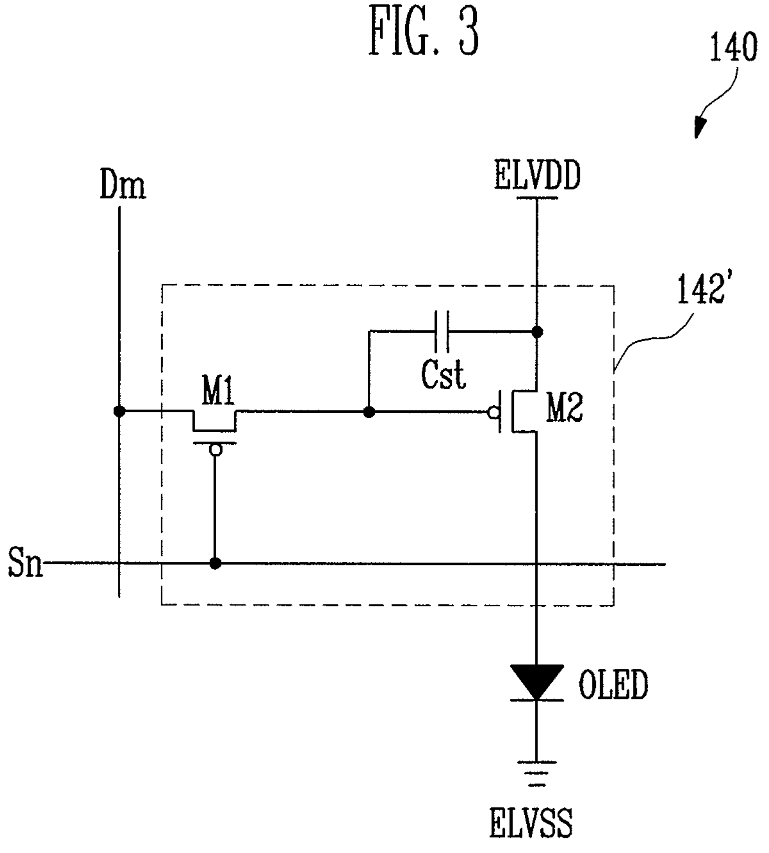
FIG. 3 is a view illustrating an embodiment of the pixel circuit of FIG. 2.

FIG. 3 is a view illustrating one embodiment of the pixel of FIG. 2.

Referring to FIG. 3, a pixel circuit 142' includes a first transistor M1, a second transistor M2, and a storage capacitor Cst.

The gate electrode of the first transistor M1 is coupled to the scan line Sn and the first electrode of the first transistor M1 is coupled to the data line Dm. The second electrode of the first transistor M1 is coupled to the gate electrode of the second transistor M2. The first transistor M1 is turned on when the scan signal is supplied to the scan line Sn.

The gate electrode of the second transistor M2 (a driving transistor) is coupled to the second electrode of the first transistor M1. The first electrode of the second transistor M2 is coupled to the first power ELVDD. The second electrode of the second transistor M2 is coupled to the anode electrode of the OLED.

The storage capacitor Cst is coupled between the gate electrode of the second transistor M2 and the first electrode of the second transistor M2. The storage capacitor Cst is charged with a voltage corresponding to the data signal.

In the above-described pixel 140 according to one embodiment of the present invention, the second transistor M2 is driven as a constant current source in the normal driving mode and supplies the current corresponding to the voltage stored in the storage capacitor Cst to the OLED. The second transistor M2 is driven as a switch in the standby driving mode and controls the emission and non-emission of the OLED.

A method of reducing the driving frequency of the organic light emitting display may reduce the power consumption of an organic light emitting display. However, the pixel of the organic light emitting display is formed of a plurality of transistors and the brightness of a screen may change or flicker due to leakage current when the driving frequency is reduced.

Operation processes of one embodiment will be described in detail. First, in reference to FIG. 1, in the normal driving mode, the power source 160 sets the voltage values of the first power ELVDD and the second power ELVSS so that the second transistor M2 is driven in the saturation region. Then, the scan driver 110 sequentially supplies the scan signals to the scan lines S1 to Sn so that the first transistors M1 included in the pixels 140 are sequentially turned on in units of horizontal lines (e.g., the pixels 140 on the same horizontal line or coupled to the same scan line are concurrently turned on). When the first transistor M1 is turned on, the data signal, which is set to have a voltage corresponding to a gray level (e.g., a predetermined gray level) supplied in synchronization with the scan signal is supplied to the gate electrode of the second transistor M2 via the first transistor M1. At this time, the storage capacitor Cst is charged with a voltage corresponding to the data signal.

Figure 4A:
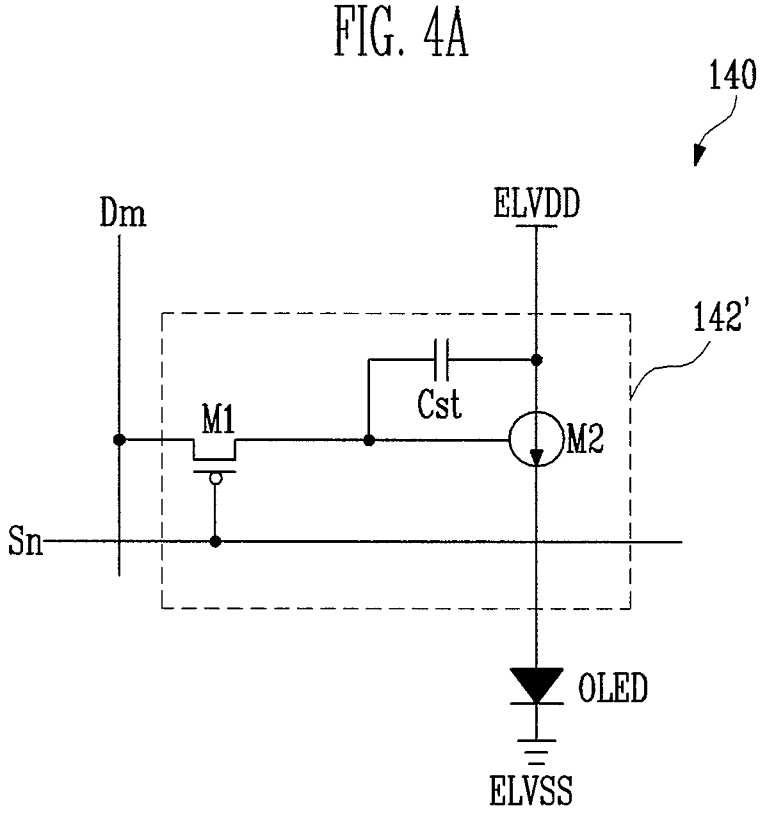
FIGS. 4A and 4B are views illustrating operation processes in a normal driving mode and a standby driving mode, respectively.

As illustrated in FIG. 4A, when the first transistor M1 is turned on in the normal driving mode, the second transistor M2 is driven in the saturation region and the second transistor M2 operates as a constant current source. That is, the second transistor M2 supplies a current corresponding to the voltage charged in the storage capacitor Cst to the OLED so that an image with a brightness corresponding to the data signal may be displayed. That is, according to embodiments of the present invention, in the normal driving mode, the second transistor M2 operates as a constant current source corresponding to the data to display an image.

On the other hand, in the standby driving mode, the power source 160 sets the voltage values of the first power ELVDD and the second power ELVSS so that the second transistor M2 may be driven in the linear region. The data driver 120 supplies the data signal corresponding to the emission or non-emission of the pixel to the data lines D1 to Dm. The data driver 120 controls the voltage of the data signal so that the second transistor M2 included in the pixel 140 may be driven as a switch. For example, when the pixel 140 is set to emit light, an emission voltage (e.g, a sufficiently low voltage) is supplied so that the second transistor M2 may be completely turned on. When the pixel 140 is not set to emit light, a non-emission voltage (e.g., a sufficiently high voltage) is supplied so that the second transistor M2 may be completely turned off.

Then, the scan driver 110 sequentially supplies the scan signals to the scan lines S1 to Sn so that the first transistors M1 included in the pixels 140 are sequentially turned on in units of horizontal lines (e.g., the pixels 140 on the same horizontal line or coupled to the same scan line are concurrently turned on). When the first transistor M1 is turned on, the data signal (set as the emission or non-emission voltage) supplied in synchronization with the scan signal is supplied to the gate electrode of the second transistor M2 via the first transistor M1. At this time, the storage capacitor Cst is charged with a voltage corresponding to the data signal.

Figure 4B:
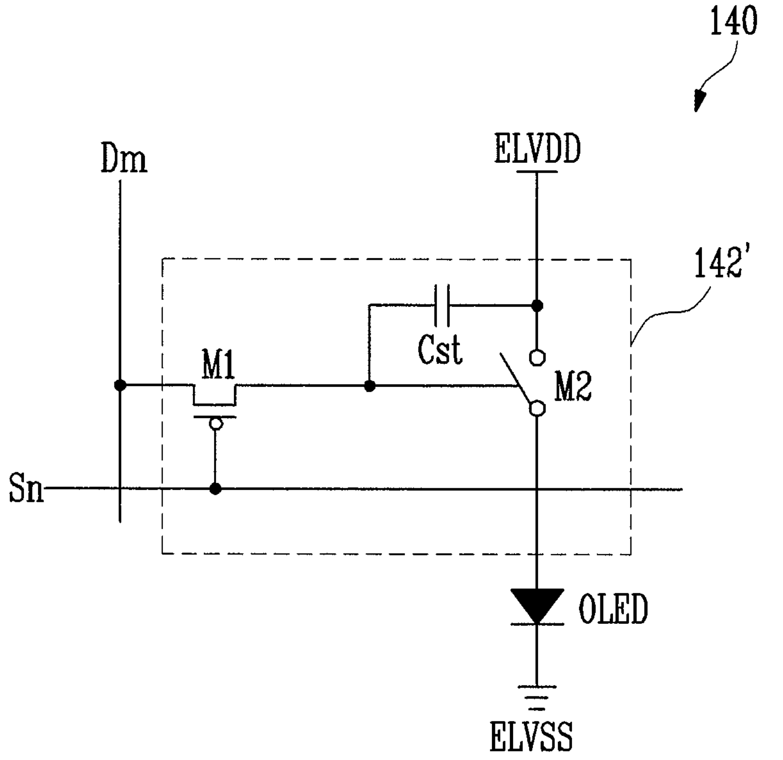

As illustrated in FIG. 4B, because the second transistor M2 is driven in the linear region, the second transistor M2 is driven as a switch. That is, the second transistor M2 is turned on or off according to the voltage charged in the storage capacitor Cst to control the emission or non-emission of the OLED. That is, according to embodiments of the present invention, in the standby driving mode, the second transistor M2 is driven as a switch to display an image.

In the above-described standby driving mode, because the voltages of the first power ELVDD and the second power ELVSS are controlled so that the second transistor M2 is driven in the linear region, power consumption may be reduced. In addition, because the second transistor M2 is driven only as a switch, although leakage current is generated by the first transistor M1, this current does not significantly affect the brightness of the display. Therefore, in the standby driving mode, the organic light emitting display may be driven with a reduced driving frequency so that power consumption may be additionally reduced.

Figure 5:
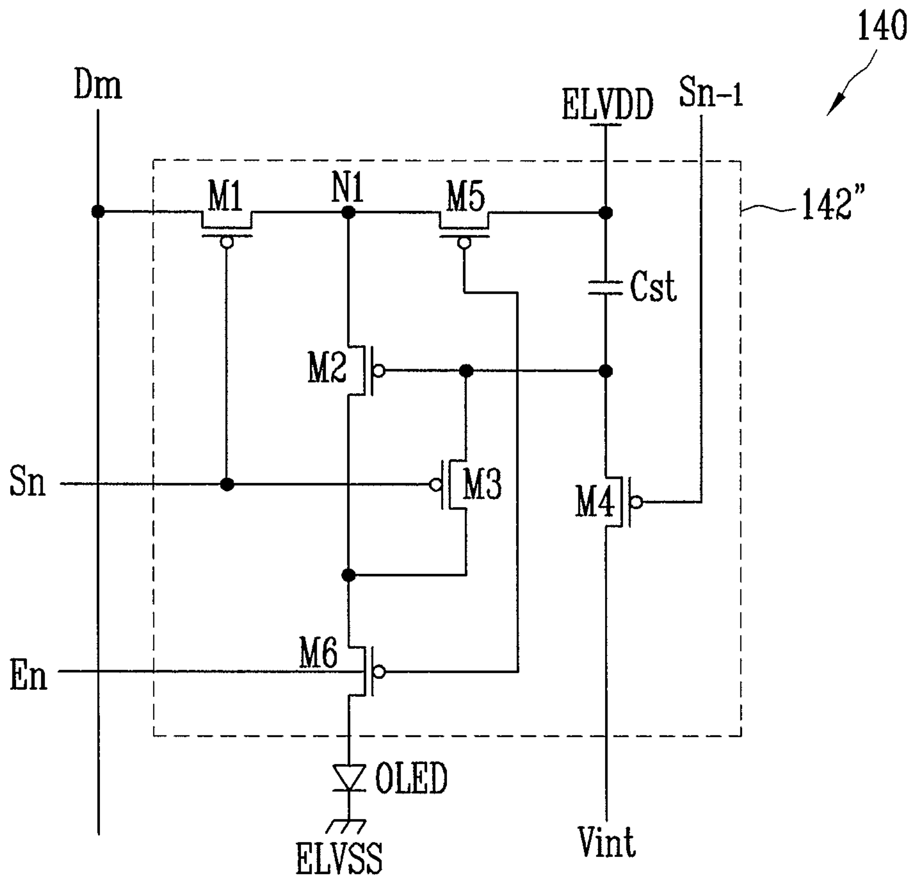
FIG. 5 is a view illustrating another embodiment of the pixel circuit of FIG. 2.

FIG. 5 is a view illustrating another embodiment of the pixel circuit of FIG. 2.

Referring to FIG. 5, a pixel circuit 142" includes first to sixth transistors M1 to M6 and a storage capacitor Cst. The principle of operation of the pixel circuit 142" in the normal driving mode and the standby driving mode is substantially the same as the principle of operation of the pixel circuit 142' illustrated in FIG. 3 except that the transistors M3 to M6 are additionally included to compensate for the threshold voltage of the second transistor M2.

The first electrode of the first transistor M1 is coupled to the data line Dm and the second electrode of the first transistor M1 is coupled to a first node N1. The gate electrode of the first transistor M1 is coupled to the nth scan line Sn. The first transistor M1 is turned on when the scan signal is supplied to the nth scan line Sn to supply the data signal supplied to the data line Dm to the first node N1.

The first electrode of the second transistor M2 is coupled to the first node N1 and the second electrode of the second transistor M2 is coupled to the first electrode of the sixth transistor M6. The gate electrode of the second transistor M2 is coupled to the storage capacitor Cst. The second transistor M2 supplies a current corresponding to the voltage charged in the storage capacitor Cst to the OLED.

The first electrode of the third transistor M3 is coupled to the second electrode of the second transistor M2 and the second electrode of the third transistor M3 is coupled to the gate electrode of the second transistor M2. The gate electrode of the third transistor M3 is coupled to the nth scan line Sn. The third transistor M3 is turned on when the scan signal is supplied to the nth scan line Sn to diode couple the second transistor M2.

The gate electrode of the fourth transistor M4 is coupled to the (n−1)th scan line Sn−1 and the first electrode of the fourth transistor M4 is coupled to one terminal of the storage capacitor Cst and the gate electrode of the second transistor M2. The second electrode of the fourth transistor M4 is coupled to an initialization power source Vint. The fourth transistor M4 is turned on when the scan signal is supplied to the (n−1)th scan line Sn−1 to apply the voltage of the initialization power source Vint to one terminal of the storage capacitor Cst and to the gate electrode of the second transistor M2 to the initialization power source Vint.

The first electrode of the fifth transistor M5 is coupled to the first power ELVDD and the second electrode of the fifth transistor M5 is coupled to the first node N1. The gate electrode of the fifth transistor M5 is coupled to the emission control line En. The fifth transistor M5 is turned on when the emission control signal is not supplied from the emission control line En to electrically couple the first power ELVDD to the first node N1.

The first electrode of the sixth transistor M6 is coupled to the second electrode of the second transistor M2 and the second electrode of the sixth transistor M6 is coupled to the anode electrode of the OLED. The gate electrode of the sixth transistor M6 is coupled to the emission control line En. The sixth transistor M6 is turned on when the emission control signal is not supplied to supply the current supplied from the second transistor M2 to the OLED (here, the emission control signal is a logic high signal when it is supplied).

In the above-described pixel 140 according to one embodiment of the present invention, the second transistor M2 is driven as a constant current source in the normal driving mode and supplies the current corresponding to the voltage stored in the storage capacitor Cst to the OLED. In the standby driving mode, the second transistor M2 is driven as a switch and controls the emission and non-emission of the OLED.

Figure 6:
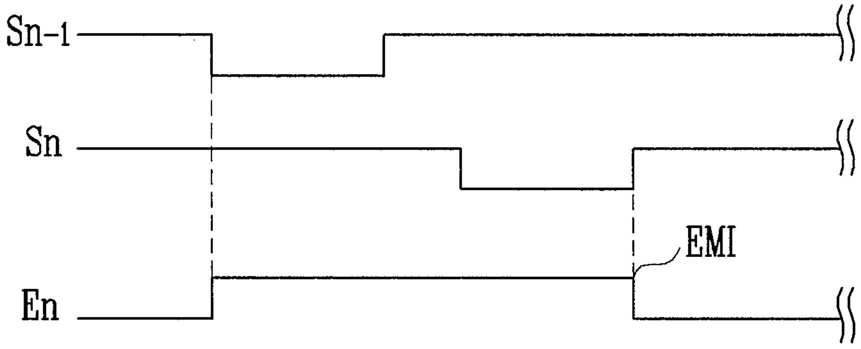
FIG. 6 is a waveform diagram illustrating a method of driving the pixel circuit of FIG. 5.

FIG. 6 is a waveform diagram illustrating the driving waveforms supplied to the pixel of FIG. 5.

Referring to FIG. 6, first, the scan signal is supplied to the (n−1)th scan line Sn−1 so that the fourth transistor M4 is turned on. When the fourth transistor M4 is turned on, the voltage of the initialization power source Vint is supplied to one terminal of the storage capacitor Cst and the gate terminal of the second transistor M2. That is, when the fourth transistor M4 is turned on, the voltage of one terminal of the storage capacitor Cst and the voltage of the gate terminal of the second transistor M2 are initialized to the voltage of the initialization power source Vint. Here, the voltage value of the initialization power source Vint is set to be smaller than the voltage value of the data signal.

Then, the scan signal is supplied to the nth scan line Sn. When the scan signal is supplied to the nth scan line Sn, the first transistor M1 and the third transistor M3 are turned on (here, the scan signal is a logic low signal when it is supplied). When the third transistor M3 is turned on, the second transistor M2 is diode-connected. When the first transistor M1 is turned on, the data signal supplied to the data line Dm is supplied to the first node N1 via the first transistor M1. At this time, because the voltage of the gate electrode of the second transistor M2 is set at the voltage of the initialization power source Vint (that is, because the voltage of the second transistor M2 is set to be lower than the voltage of the data signal supplied to the first node N1) the second transistor M2 is turned on.

When the second transistor M2 is turned on, the data signal applied to the first node N1 is supplied to one terminal of the storage capacitor Cst via the second transistor M2 and the third transistor M3. Because the data signal is supplied to the storage capacitor Cst via the second transistor M2 coupled in the form of a diode, the voltages corresponding to the data signal and the threshold voltage of the second transistor M2 are charged in the storage capacitor Cst.

After the voltages corresponding to the data signal and the threshold voltage of the second transistor M2 are charged in the storage capacitor Cst, the supply of an emission control signal EMI is stopped (e.g., the emission control line En is applied with a logic low signal) so that the fifth transistor M5 and the sixth transistor M6 are turned on. When the fifth transistor M5 and the sixth transistor M6 are turned on, a current path from the first power ELVDD to the OLED is formed. In this case, the second transistor M2 controls an amount of current corresponding to the voltage charged in the storage capacitor Cst to flow from the first power ELVDD to the OLED.

Because the voltage corresponding to the threshold voltage of the second transistor M2 as well as the data signal is additionally charged in the storage capacitor Cst included in the pixel 140, the amount of current that flows to the OLED may be controlled regardless of the threshold voltage of the second transistor M2.

In the normal driving mode, the power source 160 sets the voltage values of the first power ELVDD and the second power ELVSS so that the second transistor M2 is driven in the saturation region. Then, the data driver supplies data signals having voltages capable of displaying an image with gray levels (e.g., predetermined gray levels) to the data lines D1 to Dm. In this case, the second transistor M2 is driven as a constant current source corresponding to the data signal to display an image.

In the standby driving mode, the power source 160 sets the voltage values of the first power ELVDD and the second power ELVSS so that the second transistor M2 may be driven in the linear region. The data driver 120 supplies data signals corresponding to the emission or non-emission of the pixels to the data lines D1 to Dm. The data driver 120 controls the voltage of the data signal so that the second transistor M2 included in the pixel 140 may be driven as a switch. For example, when the pixel 140 is set to emit light, a data signal having a sufficiently low voltage is supplied so that the second transistor M2 may be completely turned on. When the pixel 140 is set to not emit light, a data signal having a sufficiently high voltage is supplied so that the second transistor M2 may be completely turned off. In this way, the second transistor M2 may be driven as a switch to display an image.

In the above description, when the organic light emitting display is driven in the standby driving mode, it is assumed that the voltage of the data signal is a voltage at which the second transistor M2 may be completely turned on or a voltage at which the second transistor M2 may be completely turned off. However, a currently commonly used data driver 120 supplies a data signal in order to display an image with a gray level (e.g., a predetermined gray level) and outputs voltages from 0V to 4V. Therefore, the data driver might not be able to supply the voltage of the described data signal in the standby driving mode.

Figure 7:
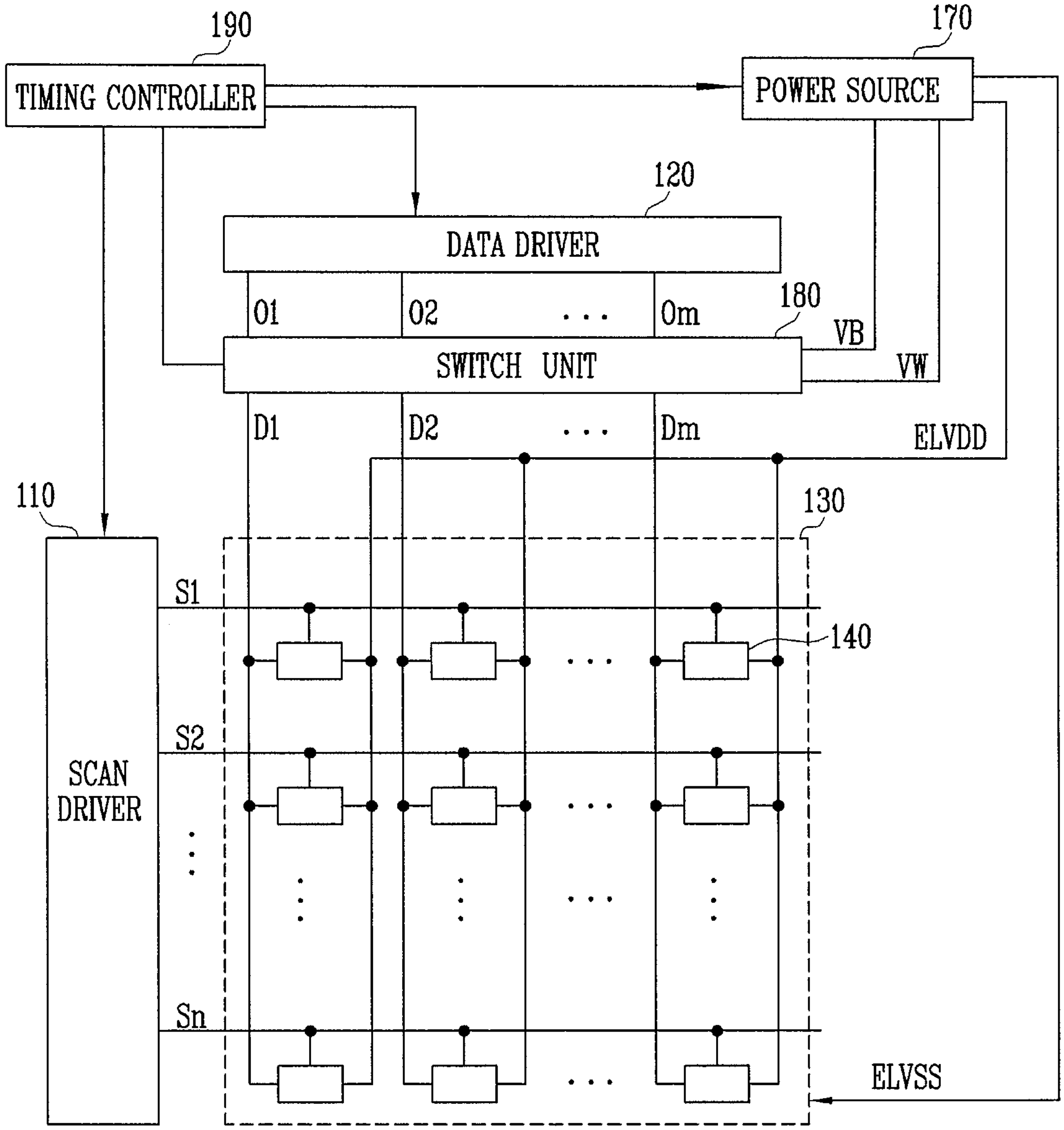
FIG. 7 is a view illustrating an organic light emitting display according to another embodiment of the present invention.

FIG. 7 is a view illustrating an organic light emitting display according to another embodiment of the present invention. When FIG. 7 is described, elements that are substantially the same as elements of FIG. 1 are denoted by the same reference numerals and description thereof will be omitted.

Referring to FIG. 7, an organic light emitting display according to another embodiment of the present invention includes a scan driver 110, a data driver 120, a display unit 130 including pixels 140, a timing controller 190, a power source 170, and a switch unit 180.

The power source 170 controls the voltage of the first power ELVDD and/or the second power ELVSS according to the mode control signal supplied from the timing controller 190. For example, the power source 170 sets the voltage values of the first power ELVDD and the second power ELVSS so that the driving transistors included in the pixels 140 may be driven in the saturation region when the first mode control signal is input from the timing controller 190. The power source 170 sets the voltage values of the first power ELVDD and the second power ELVSS so that the driving transistors included in the pixels 140 may be driven in the linear region when the second mode control signal is input from the timing controller 190.

The power source 170 generates a third power VW and a fourth power VB and supplies the third and fourth powers VW and VB to the switch unit 180. The third power VW is set to have a voltage at which the driving transistors included in the pixels 140 may be completely turned on in both the normal driving mode and the standby driving mode. For example, the third power VW may be set to have a voltage less than or equal to the voltage of the lowermost data signal that may be output from the data driver 120.

The fourth power VB is set to have a voltage less than or equal to the voltage of the lowermost data signal output from the data driver 120 in the normal driving mode and is set to have a voltage at which the driving transistors included in the pixels 140 may be completely turned off in the standby driving mode.

The switch unit 180 is located between the data driver 120 and the pixels 140. In FIG. 7, for the sake of convenience, the switch unit 180 is shown to be located between the output terminals O1 to Om and the data lines D1 to Dm of the data driver 120. The switch unit 180 selectively supplies the data signal supplied from the data driver 120 and the voltages of the third and fourth powers VW and VB supplied from the power source 170 to the data lines D1 to Dm.

For example, the data driver 120 supplies the data signals to the data lines D1 to Dm when the data driver 120 is driven in the normal driving mode. The switch unit 180 supplies the voltages of the third and fourth powers VW and VB to the data lines D1 to Dm when the data driver 120 is driven in the standby driving mode.

The timing controller 190 controls the scan driver 110 so that the scan signals may be generated and controls the data driver 120 so that the data signals may be generated. In addition, the timing controller 190 determines the mode of the organic light emitting display and supplies the mode control signal to the power source 170 according to the determined mode. The timing controller 190 supplies the control signals to control the turning on and off of the transistors included in the switch unit 180.

Figure 8:
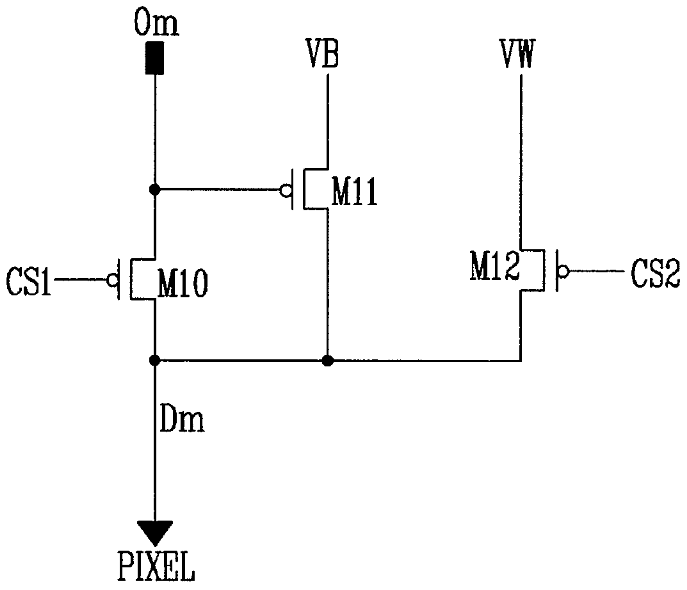
FIG. 8 is a view illustrating a portion of the switch unit of FIG. 7 according to an embodiment of the present invention.

FIG. 8 is a circuit diagram illustrating a portion of the switch unit 180 of FIG. 7. In FIG. 8, for the sake of convenience, the structure of the circuit is illustrated as being coupled to the mth output terminal Om.

Referring to FIG. 8, the switch unit 180 includes a tenth transistor M10 located between the output terminal Om and the data line Dm, an eleventh transistor M11 coupled to the data line Dm and receives the fourth power VB, and a twelfth transistor M12 is coupled to the data line Dm and receives the third power VW.

The tenth transistor M10 is located between the output terminal Om and the data line Dm and is turned on or off according to the first control signal CS1 supplied from the timing controller 190. The tenth transistor M10 is located in each channel (e.g., each column of pixels) and is continuously turned on in the normal driving mode period and turned off in the standby driving mode period.

The eleventh transistor M11 is coupled to the data line Dm and receives the fourth power VB and is turned on or off according to the voltage supplied from the output terminal Om. The eleventh transistor M11 is located in each channel (e.g., each column of pixels), is continuously turned off in the normal driving mode, and is turned on or off according to the voltage supplied to the output terminal Om in the standby driving mode period. The voltage supplied to the output terminal Om in the standby driving mode period supplies the voltage at which the eleventh transistor M11 may be turned on when black is to be displayed by the pixel 140 and supplies the voltage at which the eleventh transistor M11 may be turned off when black is not to be displayed by the pixel 140.

The twelfth transistor M12 is coupled to the data line Dm and receives the third power VW and is turned on or off according to the second control signal CS2 supplied from the timing controller 190. The twelfth transistor M12 is continuously turned off in the normal driving mode period and is repeatedly turned on and off in the standby driving mode. In the standby driving mode, the twelfth transistor M12 is turned off in a period where the scan signal is supplied and is turned on in a period where the scan signal is not supplied (in a period between the scan signals). At least one twelfth transistor M12 is provided in the switch unit 180. In one embodiment, one twelfth transistor M12 may be provided to supply the third power VW to the data lines D1 to Dm. In another embodiment, the twelfth transistor M12 may be provided in each channel (e.g., each column of pixels) so that the third power VW may be supplied to the data lines D1 to Dm, respectively.

Figure 9A:
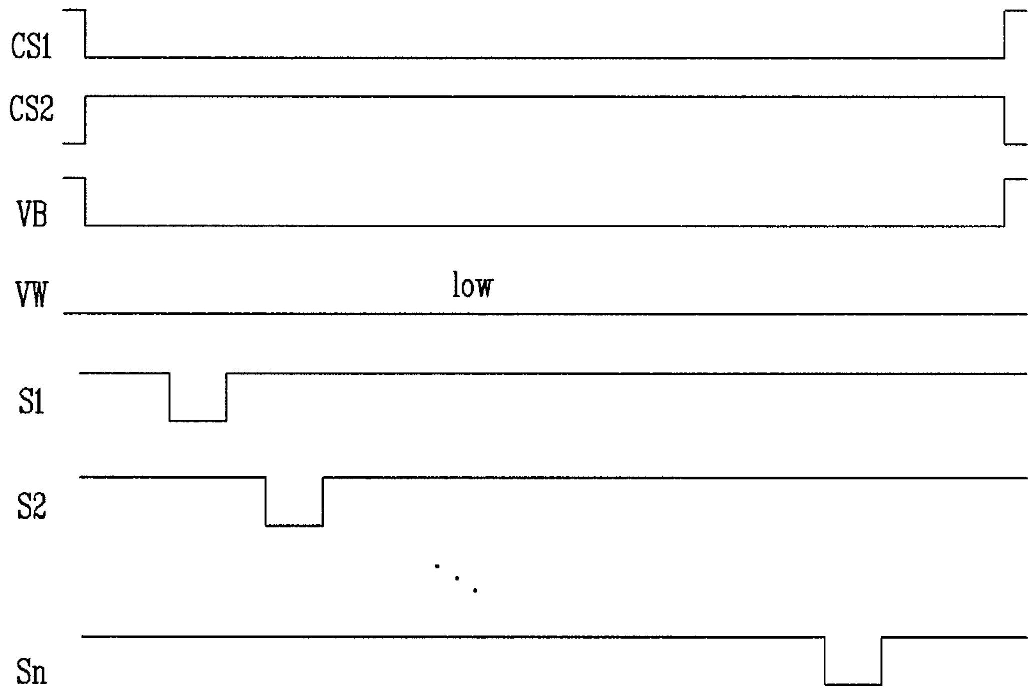
FIGS. 9A and 9B are views illustrating the operation processes of the switch unit in a normal driving mode and a standby driving mode according to an embodiment of the present invention.

FIG. 9A is waveform diagram illustrating the driving waveforms in the normal driving mode period.

Referring to FIG. 9A, in the normal driving mode period, the first control signal CS1 is supplied at a low level so that the tenth transistor M10 is turned on and the second control signal CS2 is supplied at a high level so that the twelfth transistor M12 is turned off. Then, in the normal driving mode period, the power source 170 sets the voltage of the fourth power VB to have a voltage less than or equal to the voltage of the lowermost data signal output from the data driver 120.

Then, the scan signals are sequentially supplied to the scan lines S1 to Sn and the data signals are supplied to the data lines D1 to Dm in synchronization with the scan signals. The data signals supplied to the data lines are supplied to the pixels 140 via corresponding tenth transistors M10. Because the fourth power VB is set to have a voltage less than or equal to the voltage of the lowermost data signal output from the data driver 120, the eleventh transistor M11 is continuously turned off regardless of the data signal.

That is, in the normal driving mode period, the tenth transistor M10 is turned on so that the data signal may be stably supplied to the pixel 140. In the normal driving mode period, the eleventh transistor M11 and the twelfth transistor M12 are continuously turned off so that the organic light emitting display may be stably turned on.

Figure 9B:
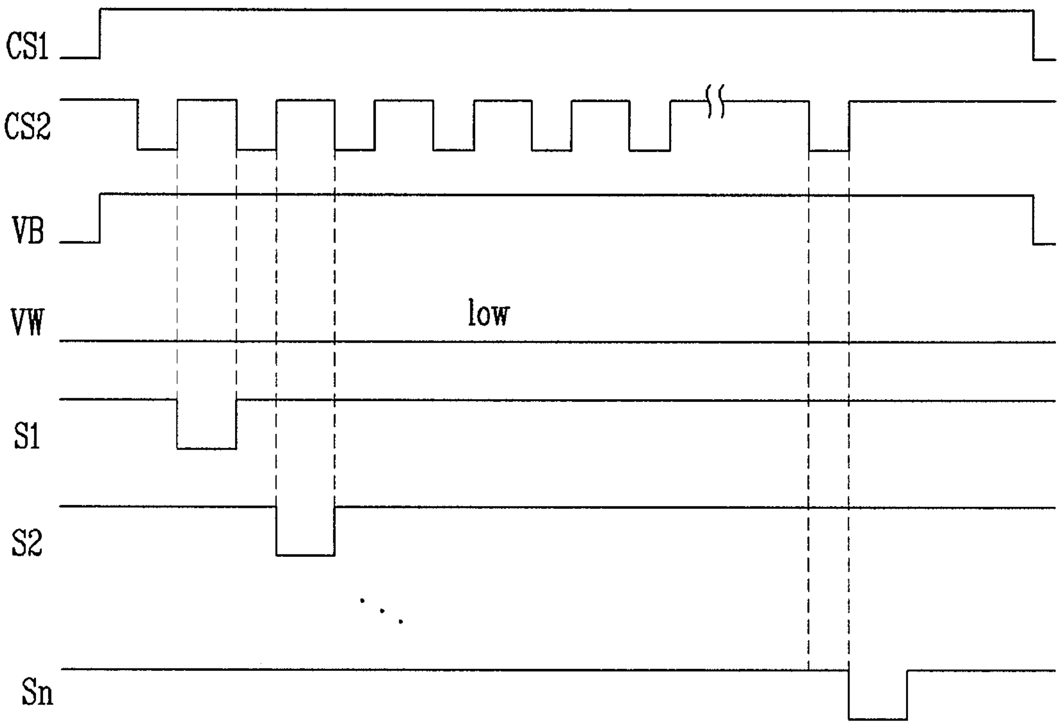

FIG. 9B is a waveform diagram illustrating the driving waveforms in the standby driving mode period.

Referring to FIG. 9B, in the standby driving mode period, the first control signal CS1 is supplied at a high level so that the tenth transistor M10 is turned off. Then, in the standby driving mode period, the twelfth transistor M12 turns on and off (e.g., repeatedly turns on and off) so that the turned on periods do not overlap with the scan signal. In addition, the eleventh transistor M11 provided in each channel (e.g., each column of pixels) is turned on or off according to the voltage supplied from the corresponding output terminals O1 to Om. In the standby driving mode period, the power source 170 sets the voltage of the fourth power VB so that the driving transistors included in the pixels 140 may be completely turned off.

Operation processes will be described in detail. First, before the scan signal is supplied to the first scan line S1, the twelfth transistor M12 is turned on by the second control signal CS2 at a low level. When the twelfth transistor M12 is turned on, the voltage of the third power VW is supplied to the data line Dm. In this case, the parasitic capacitance (not shown) of the data line Dm is charged with the voltage of the third power VW.

Then, the twelfth transistor M12 is turned off by the second control signal CS2 at a high level and the scan signal is supplied to the first scan line S1. When the specific pixel 140 coupled to the first scan line Sn and the mth data line Dm is set to emit light, the output terminal Om supplies the voltage at which the eleventh transistor M11 may be turned off. When the specific pixel 140 is set not to emit light, the output terminal Om supplies the voltage at which the eleventh transistor M11 may be turned on.

In further detail, when the specific pixel 140 is set to emit light, the eleventh transistor M11 is set to be turned off. In this case, the specific pixel 140 selected by the scan signal receives the voltage of the third power VW charged in the parasitic capacitance of the data line Dm. When the voltage of the third power VW is supplied to the specific pixel 140, the driving transistors are completely turned on so that the specific pixel 140 emits light.

In further detail, when the specific pixel 140 is set not to emit light, the eleventh transistor M11 is turned on. In this case, the specific pixel 140 selected by the scan signal receives the voltage of the fourth power VB. When the voltage of the fourth power VB is supplied to the specific pixel 140, the driving transistor is completely turned off so that the specific pixel 140 does not emit light. Then, the above processes are repeated for each scan line and the emission and non-emission of the pixels 140 are controlled in units of horizontal lines until the scan signal is supplied to the nth scan line so that an image including information (e.g., predetermined information) is displayed.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display, comprising:

a scan driver configured to sequentially supply scan signals to scan lines;

a data driver configured to supply data signals to data lines in synchronization with the scan signals;

a switch unit coupled directly to output terminals of the data driver and coupled directly to the data lines;

pixels located at crossing regions of the scan lines and the data lines, each of the pixels comprising a driving transistor;

a timing controller configured to determine a normal driving mode for displaying a normal image or a standby driving mode for displaying less information than the normal image; and a power source configured to supply a first power and a second power to the pixels and a third power and a fourth power to the switch unit, wherein a voltage difference between the first power and the second power in the normal driving mode is a first voltage, and a voltage difference between the first power and the second power in the standby driving mode is a second voltage different from the first voltage, wherein the data driver is configured to supply the data signals corresponding to a first plurality of gray levels having a first bit resolution ($2^j$) in the normal driving mode and supply the data signals corresponding to a second plurality of gray levels having a second bit resolution ($2^k$) in the standby driving mode, wherein, in the standby driving mode, the switch unit is configured to transmit, selectively, the voltages of the third power and the fourth power to the data lines in accordance with the data signals corresponding to the second plurality of gray levels, and wherein j is greater than k.

2. The organic light emitting display as claimed in claim 1, wherein the first voltage is larger than the second voltage.

3. The organic light emitting display as claimed in claim 1, wherein the data driver is configured to supply the data signals corresponding to various gray levels in the normal driving mode and supply the data signals determining emission or non-emission of the pixels in the standby driving mode.

4. The organic light emitting display as claimed in claim 1, wherein each of the pixels comprises:

an organic light emitting diode (OLED) having a cathode electrode for receiving the second power; and a pixel circuit receiving the first power and coupled to an anode electrode of the OLED and to control the amount of current supplied to the OLED.

5. The organic light emitting display as claimed in claim 4, wherein the pixel circuit comprises the driving transistor, and wherein the power source is configured to set the voltages of the first power and the second power so that the driving transistor is driven in a saturation region in the normal driving mode.

6. The organic light emitting display as claimed in claim 4, wherein the pixel circuit comprises the driving transistor, and wherein the power source is configured to set the voltages of the first power and the second power so that the driving transistor is driven in a linear region in the standby driving mode.

7. The organic light emitting display as claimed in claim 6, wherein the data driver is configured to supply the data signals for turning the driving transistor on and off in the standby driving mode.

8. The organic light emitting display as claimed in claim 4, wherein the power source is further configured to supply the third power at the same voltage value in the standby driving mode and in the normal driving mode and the fourth power a different voltage in the standby driving mode than in the normal driving mode.

9. The organic light emitting display as claimed in claim 8, wherein the pixel circuit comprises the driving transistor, and wherein the third power has a voltage that completely turns on the driving transistor.

10. The organic light emitting display as claimed in claim 9, wherein the third power has a voltage less than or equal to the voltage of the lowermost data signal output from the data driver.

11. The organic light emitting display as claimed in claim 8, wherein each of the pixel circuits comprises the driving transistor, and wherein the fourth power is configured to have a voltage less than or equal to the voltage of the lowermost data signal supplied from the data driver in the normal driving mode and is configured to have a voltage that completely turns off the driving transistors in the standby driving mode.

12. An organic light emitting display, comprising:

a scan driver configured to sequentially supply scan signals to scan lines;

a data driver configured to supply data signals to data lines in synchronization with the scan signals;

pixels located at crossing regions of the scan lines and the data lines;

a timing controller configured to determine a normal driving mode for displaying a normal image or a standby driving mode for displaying less information than the normal image; and a power source configured to supply a first power and a second power to the pixels, wherein a voltage difference between the first power and the second power in the normal driving mode is a first voltage, and a voltage difference between the first power and the second power in the standby driving mode is a second voltage different from the first voltage, wherein the data driver is configured to supply the data signals corresponding to a first plurality of gray levels in the normal driving mode and supply the data signals determining a second plurality of gray levels in the standby driving mode, wherein the number of gray levels in second plurality of gray levels is fewer than the number of gray levels in the first plurality of gray levels, wherein each of the pixels comprises:

an organic light emitting diode (OLED) having a cathode electrode for receiving the second power; and a pixel circuit receiving the first power and coupled to an anode electrode of the OLED and to control the amount of current supplied to the OLED, wherein the power source is further configured to supply a third power that maintains the same voltage value in the standby driving mode as in the normal driving mode and a fourth power whose voltage in the standby driving mode is different from its voltage in the normal driving mode, and wherein the organic light emitting display further comprises a switch unit coupled directly to output terminals of the data driver and coupled directly to the data lines, configured to transmit the data signals supplied from the output terminals of the data driver to the data lines in the normal driving mode period, and to transmit, selectively, the voltages of the third power and the fourth power to the data lines in accordance with the data signals supplied from the output terminals of the data driver in the standby driving mode period.

13. The organic light emitting display as claimed in claim 12, wherein the switch unit comprises:

a first transistor located between an output terminal of the output terminals and a data line of the data lines, wherein the timing controller is configured to supply a first control signal to continuously turn on the first transistor in the normal driving mode and to turn off the first transistor in the standby driving mode;

a second transistor for receiving the fourth power and coupled to the data line of the data lines, wherein the data driver is configured to turn on and turn off the second transistor in the standby driving mode; and a third transistor for receiving the third power and coupled to the data line of the data lines, wherein the timing controller is configured to supply a second control signal to repeatedly turn on and turn off the third transistor in the standby driving mode.

14. The organic light emitting display as claimed in claim 13, wherein the timing controller is configured to, in the standby driving mode, turn off the third transistor in a period where the scan signal is supplied and to turn on the third transistor in a period where the scan signal is not supplied to supply the third power to the data line of the data lines.

15. The organic light emitting display as claimed in claim 13, wherein the data driver is configured to, in the standby driving mode and in a period where the scan signal is supplied, supply a data signal to turn on the second transistor when a pixel selected by the scan signal is set not to emit light and to supply a data signal to turn off the second transistor when a pixel selected by the scan signal is set to emit light.

16. A method of driving an organic light emitting display comprising pixels including driving transistors for controlling an amount of current flowing from a first power source to a second power source via an organic light emitting diode (OLED), the method comprising:

determining a normal driving mode for displaying a normal image or a standby driving mode for displaying less information than the normal image;

in the normal driving mode, setting the voltages of the first power source and the second power source to drive the driving transistors in a saturation region;

in the normal driving mode, supplying data signals to display an image with a first plurality of gray levels by the pixels, the first plurality of gray levels having a first bit resolution ($2^j$);

in the standby driving mode, setting the voltages of the first power source and the second power source to drive the driving transistors in a linear region; and in the standby driving mode, supplying data signals to display an image with a second plurality of gray levels by the pixels, the second plurality of gray levels having a second bit resolution ($2^k$), wherein j is greater than k, the data signals controlling, selectively, application of voltages of a third power source and a fourth power source to the pixels.

17. The method as claimed in claim 16, further comprising driving the driving transistors as switches for the data signals to control the pixels to emit light or not to emit light in the standby driving mode.

* * * * *